US 9,903,490 B2

(12) United States Patent
Matsuyama et al.

(10) Patent No.: US 9,903,490 B2
(45) Date of Patent: Feb. 27, 2018

(54) SWAGING STRUCTURE INCLUDING A PRESSURE SWITCH

(71) Applicant: Kabushiki Kaisha Saginomiya Seisakusho, Tokyo (JP)

(72) Inventors: Kenichi Matsuyama, Tokorozawa (JP); Satoshi Miyakawa, Tokorozawa (JP)

(73) Assignee: KABUSHIKI KAISHA SAGINOMIYA SEISAKUSHO, Tokyo (JP)

( * ) Notice: Subject to any disclaimer, the term of this patent is extended or adjusted under 35 U.S.C. 154(b) by 0 days.

(21) Appl. No.: 14/926,374

(22) Filed: Oct. 29, 2015

(65) Prior Publication Data

US 2016/0131284 A1    May 12, 2016

(30) Foreign Application Priority Data

Nov. 7, 2014   (JP) ................... 2014-227036

(51) Int. Cl.
*H01H 35/24*    (2006.01)
*F16K 17/02*    (2006.01)
(Continued)

(52) U.S. Cl.
CPC .............. *F16K 17/02* (2013.01); *F16K 7/16* (2013.01); *F16K 37/005* (2013.01); *F16K 37/0041* (2013.01)

(58) Field of Classification Search
CPC ...... H01H 35/24; H01H 35/245; H01H 35/32; H01H 35/34; H01H 9/04; H01H 9/041; H01H 13/063
(Continued)

(56) References Cited

U.S. PATENT DOCUMENTS

| 4,479,039 A * | 10/1984 | Payne | H01H 35/2657 200/406 |
| 5,870,817 A * | 2/1999 | Sehlhorst | H01H 35/343 29/622 |
| 7,718,907 B2 * | 5/2010 | Wildman | H01H 35/343 200/83 Q |

FOREIGN PATENT DOCUMENTS

| CN | 201278331 | 7/2009 |
| JP | H02-135635 | 5/1990 |

(Continued)

OTHER PUBLICATIONS

Office Action dated Mar. 21, 2017 for Japanese Patent Application No. 2014-227036.
201510752251.X, dated Apr. 26, 2017, Chinese Office Action.

*Primary Examiner* — Vanessa Girardi
(74) *Attorney, Agent, or Firm* — Workman Nydegger

(57) ABSTRACT

The present invention provides a swaging structure having a high pressure resistance strength suitable for a high pressure switch that solves the conventional disadvantages that the swaging for providing an increased thickness causes a manufacturing facility having a larger size or the swaged part having winkles or that a pressure switch finds a difficulty in the adjustment of the swaging margin when the number of diaphragms is changed for example. A swaging structure comprises at least a to-be-swaged member required to have airtightness to a surrounding environment and a swaging member configured to retain the to-be-swaged member by a swaging processing, the swaging member has an annular side wall surrounding the to-be-swaged member to retain the to-be-swaged member after the swaging processing and the swaging structure further includes an annular spacer including therein a penetration hole to be sandwiched between the to-be-swaged member and the annular side wall after the swaging processing.

20 Claims, 9 Drawing Sheets

(51) Int. Cl.
*F16K 37/00* (2006.01)
*F16K 7/16* (2006.01)

(58) Field of Classification Search
USPC .............................. 200/81 R, 83 R; 340/438
See application file for complete search history.

(56) References Cited

FOREIGN PATENT DOCUMENTS

| JP | H11162307 | 6/1999 |
| JP | 2005-308397 | 11/2005 |
| JP | 2007-278563 | 10/2007 |

* cited by examiner

SWAGING STRUCTURE INCLUDING A PRESSURE SWITCH

CROSS-REFERENCES TO RELATED APPLICATIONS

This application claims the benefit of Japanese Patent Application No. 2014-227036, filed Nov. 7, 2014, which is hereby incorporated by reference wherein in its entirety.

BACKGROUND OF THE INVENTION

Field of the Invention

The present invention relates to a swaging structure. In particular, the invention relates to a swaging structure having a high pressure resistance performance suitable for a high pressure switch for example.

Description of the Related Art

Conventionally, a pressure switch has been known that generates, when a fluid pressure changes, an ON/OFF signal based on a fixed value as a boundary. Such a pressure switch includes the one generally configured to include a switch case, a pressure response member, and a holder. The switch case has a contact unit that opens and closes depending on the pressure sensing of the pressure response member. The pressure response member includes a pressure sensing member such as a diaphragm, a rod for transmitting the motion of the pressure sensing member to the contact unit of the switch case, and a pressure-sensitive room communicating with a pressure source via a pressure guide pipe. The holder connects the switch case and the pressure response member in an integrated manner by a swaging processing to retain them. Such a pressure switch includes known high pressure switches for detecting a high pressure fluid such as a CO2 apparatus pressure switch or a construction pressure switch. These high pressure switches maybe required, in order to retain a high pressure response member subjected to high pressure fluid, to have a very high pressure resistance performance. In order to secure a high pressure resistance performance, a holder for retaining a pressure response member has been conventionally configured to have an annular side wall having an increased thickness.

As an example of such a pressure switch, Japanese Patent Laid-Open No. H02-135635 (1990) is disclosed. The pressure switch disclosed in Patent Laid-Open No. H02-135635 (1990) provides a strong structure and an improved seal performance by swaging an end 27a of an outer case 27 to a flange unit 24 to pressure-bond the resultant structure to an end 26a of a partition wall 26.

SUMMARY OF THE INVENTION

However, the swaging for providing an increased thickness as in Patent Laid-Open No. H02-135635 (1990) causes various technical disadvantages. The swaging for providing an increased thickness requires an increased swaging load in order to swage an annular side wall having a thick thickness, which needs a manufacturing facility having a larger size, thereby causing an increased manufacture cost. Furthermore, the annular side wall having a thick thickness is bent inwardly, which not only causes the swaged part to have winkles and deteriorates the appearance but also causes a lowered quality such as a lowered dimension accuracy, cracked plating or insufficient swaging.

Furthermore, the pressure switch requires, when the swaging for providing an increased thickness is performed for example, the number or the thickness of the diaphragms to be changed. If the single holder member is combined with an increased number of diaphragms, the swaging margin is reduced. The reduced swaging margin causes a disadvantage in that the pressure response member of the pressure switch has a deteriorated pressure resistance performance.

Thus, it is an objective of the present invention to provide a swaging structure having a high pressure resistance performance suitable for a high pressure switch for example that solves the conventional disadvantages that the swaging for providing an increased thickness causes a manufacturing facility having a larger size or the swaged part having winkles or that a pressure switch finds a difficulty in the adjustment of the swaging margin when the number of diaphragms is changed for example.

In order to solve the above disadvantages, the swaging structure of the present invention includes at least a to-be-swaged member required to have airtightness to a surrounding environment and a swaging member configured to retain the to-be-swaged member by a swaging processing, wherein the swaging member has an annular side wall surrounding the to-be-swaged member to retain the to-be-swaged member after the swaging processing, and the swaging structure further includes an annular spacer including therein a penetration hole to be sandwiched between the to-be-swaged member and the annular side wall after the swaging processing.

In order to solve the disadvantage, the swaging structure of the present invention includes a pressure response member having a diaphragm as a pressure sensing means stored in a cover member and being formed to communicate with a pressure source, a micro switch having a switch for performing a switching operation based on the pressure sensing of the diaphragm, and a holder member for retaining the pressure response member and the micro switch. The holder member has a partition wall and is formed to retain the micro switch at one side relative to the partition wall and to retain the pressure response member by a swaging processing at the other side relative to the partition wall. The other side of the partition wall of the holder member for retaining the pressure response member has an annular side wall surrounding the response member. The swaging structure further includes an annular spacer including therein a penetration hole to be sandwiched between the pressure response member and the annular side wall after the swaging processing.

The spacer may have a larger area contacting the pressure response member than an area contacting the annular side wall.

The spacer may have a rectangular cross section.

The pressure response member may have a FLAT cap structure having a flat bottom face. The spacer may have a rectangular cross section to cover the entire face of the flat bottom face of the pressure response member.

The spacer may have a tapered cross section in accordance with the swaging margin.

The spacer may have a tapered cross section at the pressure response member-side face.

The spacer may have a cross section including stepped portion in accordance with the pressure response member and the swaging margin.

The micro switch may be configured to be retained by the holder member by a swaging processing.

The swaging structure of the present invention can provide a swaging structure having a high pressure resistance strength suitable for a pressure switch for example that solves the conventional disadvantages that the swaging for providing an increased thickness causes a manufacturing facility having a larger size or the swaged part having winkles or that a pressure switch finds a difficulty in the adjustment of the swaging margin when the number of diaphragms is changed for example.

Further features of the present invention will become apparent from the following description of exemplary embodiments (with reference to the attached drawings).

DESCRIPTION OF THE EMBODIMENTS

The following section will describe an embodiment of the present invention.

First, the first embodiment will be described.

In order to explain the structure of the swaging structure of the present invention, the following section will describe the basic structure of a pressure switch to which the swaging structure of the present invention is suitably applied.

Figure 1:
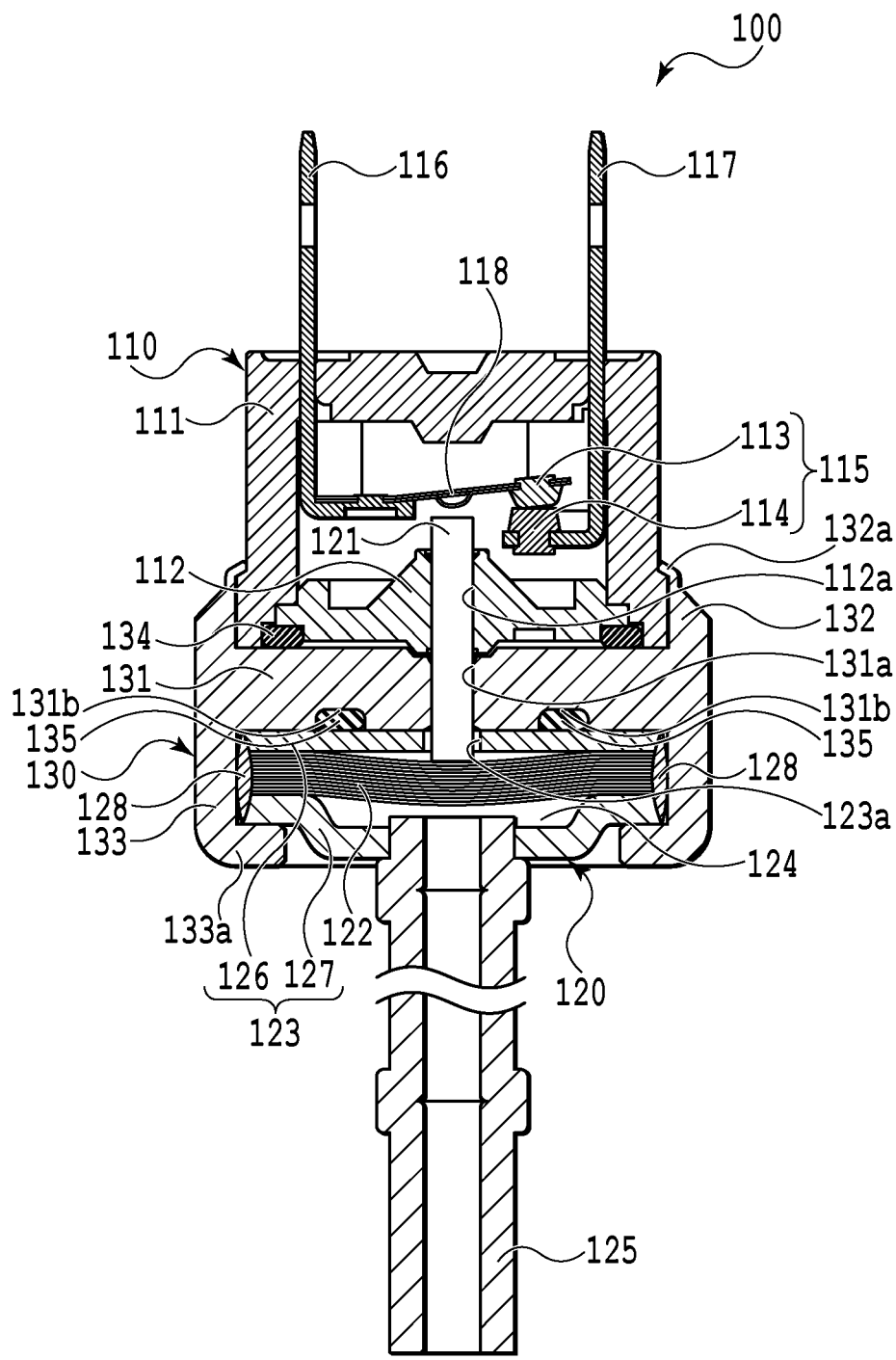
FIG. 1 is across sectional view illustrating a basic structure of a conventional pressure switch.

FIG. 1 is a cross sectional view illustrating the basic structure of a conventional pressure switch 100. In FIG. 1, the pressure switch 100 includes a micro switch 110, a pressure response member 120, and a holder member 130.

The micro switch 110 includes a switch case 111, a guide plate 112, a switch 115, a first connection terminal 116, a second connection terminal 117, and a support arm 118.

The switch case 111 and the guide plate 112 consist of electrical-insulating synthetic resin. The switch case 111 is downwardly opened in FIG. 1. The switch case 111 and the guide plate 112 are combined to form a generally-cylindrical chassis having a bottom.

The switch 115 includes a movable contact point 113 and a fixed contact point 114 and is provided in the chassis of the micro switch 110. The movable contact point 113 is connected to the first connection terminal 116 provided along the switch case 111 via the support arm 118 having elasticity. The fixed contact point 114 is directly connected to the second connection terminal 117 provided along the switch case 111 to be opposed to the first connection terminal 116. The movable contact point 113 and the fixed contact point 114 in this embodiment are arranged to be opposed in the up-and-down direction so that both of the contact points 113 and 114 always have a contact by the elasticity of the support arm 118 supporting the movable contact point 113 and thus the switch 115 is always closed.

The support arm 118 is arranged to be contacted with the upper end of a shaft 121 constituting the pressure response member 120 (which will be described later). In FIG. 1, the upward movement of the shaft 121 can be used to open the switch 115. The shaft 121 in FIG. 1 is arranged in a penetration hole 112a of the guide plate 112 as a guide member so as to be movable in the up-and-down direction.

The switch 115 transmits a current indicating ON/OFF signal for opening or closing the switch 115 to an electric circuit such as a control circuit connected via the first and second connection terminals 116 and 117 for example. As shown in this embodiment, the switch 115 is not limited to the normally-closed one and may be the normally-opened one or may include one movable contact point and two fixed contact points so that the movable contact point is switched from one fixed contact point to the other fixed contact point.

The pressure response member 120 is a member that senses a pressure to turn ON or OFF the switch 115 provided in the micro switch 110. The pressure response member 120 includes a shaft 121, a diaphragm 122, a cover member 123 having a pressure-sensitive room 124, and a pressure guide pipe 125.

The shaft 121 can be arranged so as to transmit the deformation (inversion) of the diaphragm 122 as a pressure sensing means to the support arm 118 to open or close the switch 115. As shown in FIG. 1, the shaft 121 extends into a micro switch 110 from the diaphragm 122 of the pressure response member 120 through a penetration hole 123a provided in an the upper cover 126 constituting a cover member 123, a penetration hole 131a provided in a partition wall 131, and the penetration hole 112a penetrating the guide plate 112. The shaft 121 is configured to have a length set so that the upper end of the shaft 121 is abutted to the support arm 118 having elasticity when the shaft 121 moves to the upper side and the lower end of the shaft 121 is interlocked to the deformation of the diaphragm 122.

The diaphragm 122 as a pressure sensing means is formed as a layered structure of thin metal plates in a non-limiting manner. The diaphragm 122 is stored and retained in the cover member 123 so that the upper face of the diaphragm 122 is abutted to the shaft 121 and the lower face faces a pressure-sensitive room 124 (which will be described later). As shown in FIG. 1, the diaphragm 122 is preferably arranged so as to protrude toward the pressure-sensitive room 124. This arrangement increases the deformation of the diaphragm 122 when a pressure is sensed, thus securely opening or closing the switch 115.

In this embodiment, the cover member 123 includes an upper cover 126 and a lower cover 127. The upper and lower covers 126 and 127 sandwich the diaphragm 122 and are welded together with the diaphragm 122 by a welding portion 128 and are fixed to each other. The lower cover 127 constituting the cover member 123 and the diaphragm 122 have therebetween a pressure-sensitive room 124 communicating with a pressure source. Thus, the pressure-sensitive room 124 is defined by the diaphragm 122 and the lower cover 127 and is required to have airtightness to the surrounding environment. The upper cover 126 constituting the cover member 123 is configured, as described above, to have the penetration hole 123a through which the shaft 121 interlocked with the deformation of the diaphragm 122 passes. The pressure-sensitive room 124 formed in the cover member 123 communicates with a pressure source via the pressure guide pipe 125 joined to the lower cover 127 constituting the cover member 123 by brazing in advance.

Since the pressure-sensitive room 124 communicates with a pressure source having a high pressure, the diaphragm 122 must be configured so that the pressure-sensitive room 124 has airtightness to the exterior as described above. Thus, as shown in FIG. 1, the pressure-sensitive room 124 in many cases is welded by the welding portion 128 together with the upper and lower covers 126 and 127 sandwiching the diaphragm 122 and is retained in the cover member 123.

By configuring the pressure response member 120 as described above, when the diaphragm 122 senses a fluid pressure in the pressure-sensitive room 124 and is deformed (inverted), the shaft 121 is moved upwardly and the upper end of the shaft 121 is abutted to the support arm 118 having elasticity connected to the movable contact point 113. As a result, the movable contact point 113 is moved away from the fixed contact point 114 and thus the switch 115 is opened.

The holder member 130 is a member that is made of metal and that securely retains the pressure response member 120 required to have a pressure resistance structure and that retains the pressure response member 120 and the micro switch 110 in an integrated manner. The holder member 130 may be configured so as to retain two member (specifically the micro switch 110 at the upper side sandwiches an air seal-side O ring 134 and the pressure response member 120 at the lower side sandwiches a pressure receiving-side O ring 135 to provide the retention by a swaging processing).

The holder member 130 in this embodiment includes the partition wall 131, an upper annular side wall 132 provided at the upper side of the partition wall 131, and a lower annular side wall 133 provided at the lower side of the partition wall 131. The partition wall 131 in this embodiment includes the penetration hole 131a through which the shaft 121 of the pressure response member 120 passes and an annular groove 131b at the lower face side to arrange the pressure receiving-side O ring 135. The upper annular side wall 132 provided at one upper side of the partition wall 131 has, at the upper free end thereof, a micro switch swaging portion 132a having a thin thickness for retaining the micro switch 110 as the first to-be-swaged member. Furthermore, the lower annular side wall 133 provided at the lower side as the other side of the partition wall 131 has, at the lower free end thereof, a pressure response member swaging portion 133a having a thick thickness for retaining the pressure response member 120 as the second to-be-swaged member.

In order to assemble the pressure switch 100, the micro switch 110 as the first to-be-swaged member is placed on the partition wall 131 of the holder member 130 to thereby allow the upper annular side wall 132 to surround the lower outer periphery of the micro switch 110. Then, the micro switch swaging portion 132a having a thin thickness at the free end of the upper annular side wall 132 is subjected to a swaging processing to the lower outer periphery of the micro switch 110 to thereby fix the micro switch 110 as the first to-be-swaged member to the holder member 130.

Similarly, the pressure response member 120 as the second to-be-swaged member is provided under the partition wall 131 of the holder member 130. The lower annular side wall 133 surrounds the entirety of the flat cover member 123. Thus, by subjecting the pressure response member swaging portion 133a having a thick thickness of the lower annular side wall 133 to a swaging processing to the lower cover 127 of the cover member 123, the pressure response member 120 as the second to-be-swaged member is securely fixed to the holder member 130. As can be understood from the description as described above, the holder member 130 in the pressure switch 100 is a swaging member that retains the micro switch 110 as the first or second to-be-swaged member or the pressure response member 120 by a swaging processing. Thus, it can be said that such a pressure switch 100 is configured so that the micro switch 110 or the pressure response member 120 and the holder member 130 constitute a swaging structure. This embodiment described that the micro switch 110 is subjected to a swaging processing to the holder member 130. However, the invention is not limited to this. The micro switch 110 may be fixed to the holder member 130 by press fitting or adhesive material.

Such a pressure switch 100 may be required to have a further high pressure resistance performance in order to retain the pressure response member 120 in particular. In order to secure a high pressure resistance performance, increasing the thickness of the lower annular side wall 133 of the holder member 130 for retaining the pressure response member 120 has been conventionally carried out.

Figure 2:
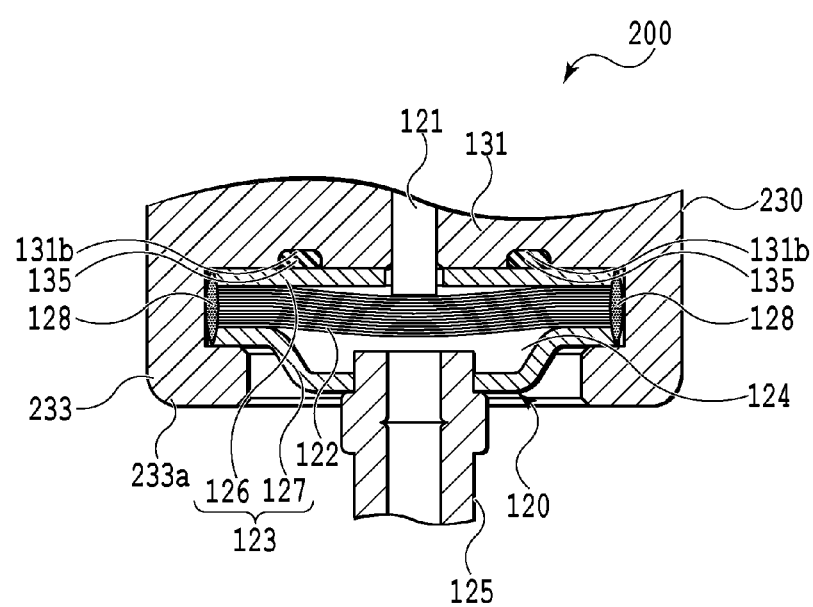
FIG. 2 is a partial cross sectional view illustrating the conventional pressure switch in which an annular side wall of a holder member has a thick thickness.

FIG. 2 is a partial expanded view of a conventional pressure switch 200 in which the annular side wall of the holder member has a thick thickness. In FIG. 2, the pressure switch 200 is configured so that the lower annular side wall 233 of the holder member 230 has a thicker thickness than that of the lower annular side wall 133 of the holder member 130 of the pressure switch 100. The other configurations are the same as those of the pressure switch 100 of FIG. 1.

When the annular side wall 233 of the holder member 230 having a thick thickness is subjected to the swaging for providing an increased thickness, a high pressure performance can be secured to a pressure source having a high pressure but a disadvantage as shown below is caused. First, when the swaging for providing an increased thickness is performed, the swaging processing must be carried out with an increased swaging load that cannot be handled by the production in existing facility, thus requiring a manufacturing facility having a larger size. The swaging processing also may cause a swaged part having winkles.

In the case of a pressure switch, the number of diaphragms must be changed. When a single holder member is combined with an increased number of diaphragms, the swaging margin may be reduced. The reduced swaging margin causes a disadvantage in that the lower cover of the cover member of the pressure switch has a deteriorated pressure resistance performance. This point will be described later with reference to FIG. 4A, FIG. 4B, FIG. 5A, and FIG. 5B.

Figure 3:
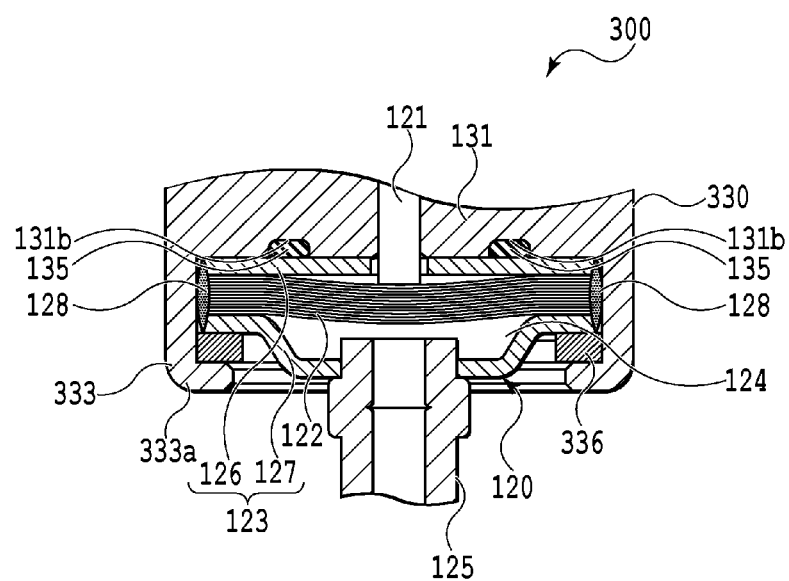
FIG. 3 is a partial cross sectional view illustrating a pressure switch of the first embodiment to which the swaging structure of the present invention is applied.

FIG. 3 is a partial cross sectional view illustrating the pressure switch 300 of the first embodiment to which the swaging structure of the present invention is applied. In FIG. 3, the pressure switch 300 is configured so that the lower cover 127 and the pressure response member swaging portion 333a sandwich an annular spacer 336 having a penetration hole at the inner side and having a rectangular cross section. The other configurations are the same as those of the configuration of the pressure switch 100 shown in FIG. 1. In this embodiment, the description will be made based on an assumption that the spacer 336 has a circular ring-like shape. However, the invention is not limited to this. The spacer 336 may have an annular shape having a penetration hole at the inner side including a rhomboid or clover-like shape. The annular side wall 333 of the holder member 330 has a long length in order to sandwich the spacer 336. However, this is not a main difference. The following section will describe this point.

Figure 4A:
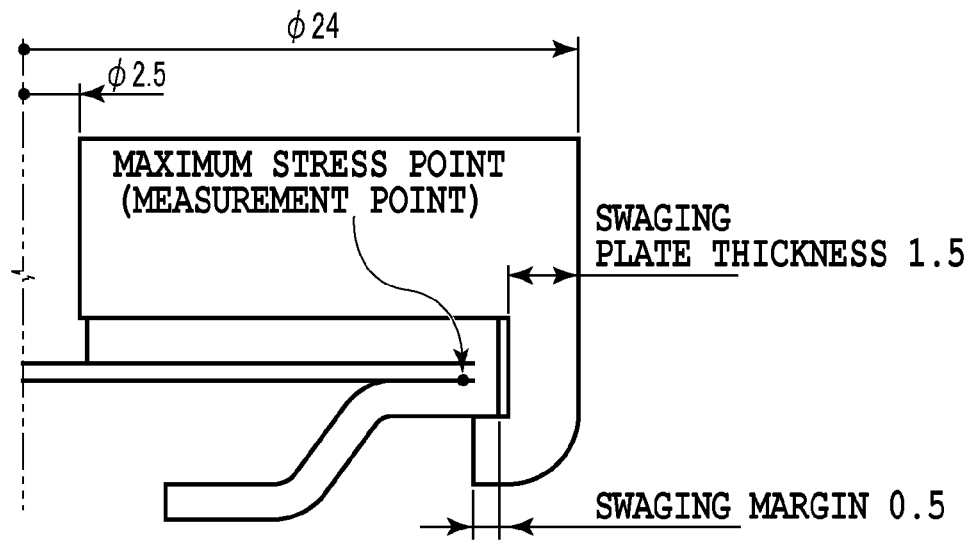
FIG. 4A illustrates a configuration for explaining the stress reduction effect of the swaging structure by a spacer, and having no spacer.
Figure 4B:
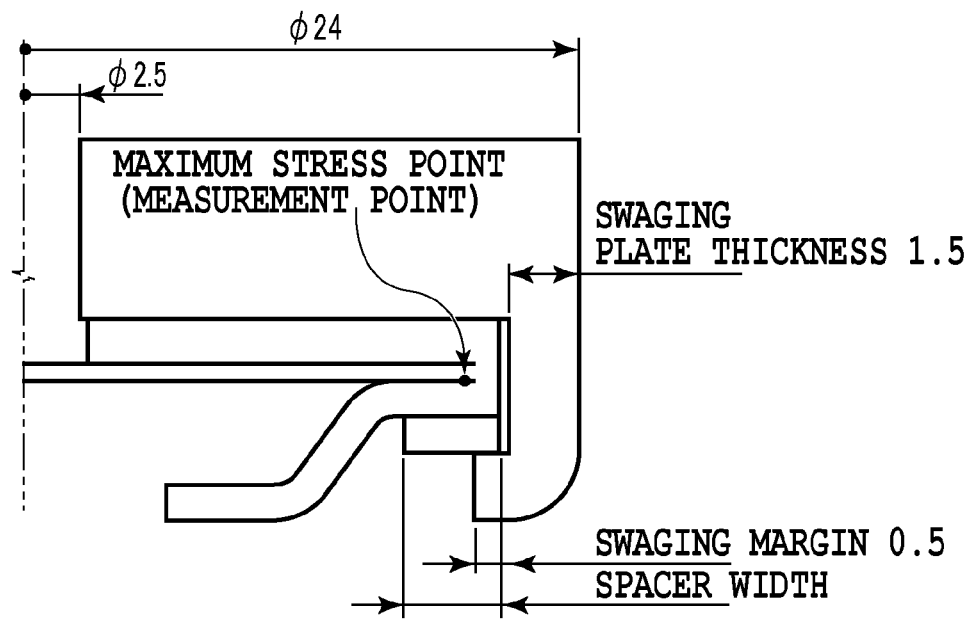
FIG. 4B illustrates a configuration for explaining the stress reduction effect of the swaging structure by a spacer, and having a spacer.
Figure 5A:
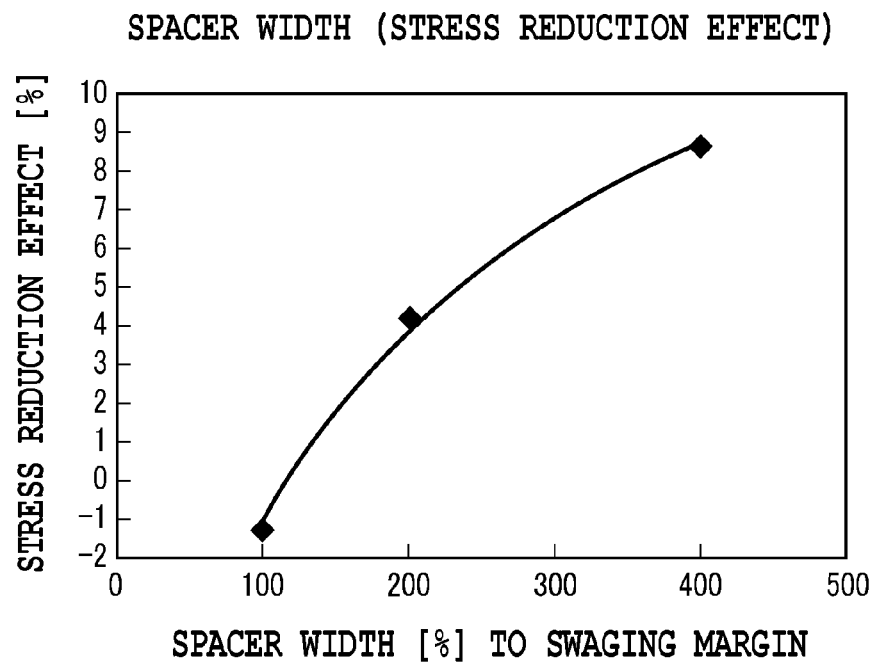
FIG. 5A is a graph for explaining the stress reduction effect of the swaging structure by the spacer, and illustrating a change of the stress reduction effect due to the spacer width.
Figure 5B:
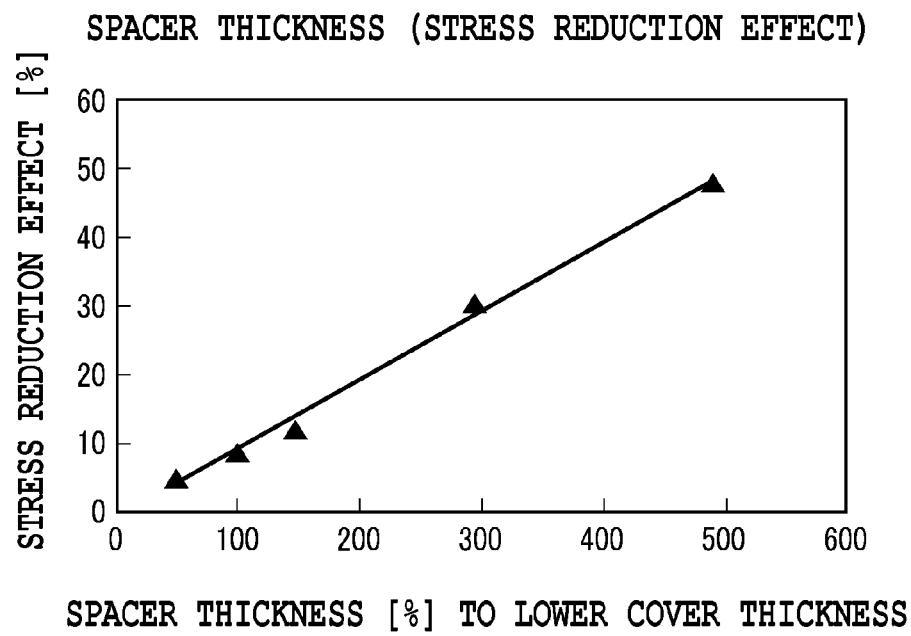
FIG. 5B is a graph for explaining the stress reduction effect of the swaging structure by the spacer, and illustrating a change of the stress reduction effect due to the spacer thickness.

FIG. 4A illustrates a configuration to explain the stress reduction effect of the swaging structure by the spacer and having no spacer. FIG. 4B illustrates a configuration to explain the stress reduction effect of the swaging structure by the spacer and having a spacer. FIG. 5A is a graph to explain the stress reduction effect of the swaging structure by the spacer and illustrating a change of the stress reduction effect by the spacer width. FIG. 5B is a graph to explain the stress reduction effect of the swaging structure by the spacer and illustrating a change of the stress reduction effect due to the spacer thickness. FIG. 5A illustrates the stress reduction effect to the spacer width when the swaging margin is 0.5 mm as a reference. FIG. 5B illustrates the stress reduction effect to the spacer thickness when the lower cover has a thickness of 0.8 mm as a reference.

With regard to the test of the stress reduction effect shown in FIG. 4A, FIG. 4B, FIG. 5A, and FIG. 5B, an analysis clarified the positions of the stresses at the maximum stress point (measurement point) shown in FIG. 4A, FIG. 4B, FIG. 5A, and FIG. 5B when the pressure P is applied from the pressure guide pipe to the pressure-sensitive room. According to the test of the stress reduction effect, when the case where the swaging margin is insufficient as shown in FIG. 4A (the swaging margin is 0.5 mm in this measurement) is compared with the case as shown in FIG. 4B where the swaging margin is 0.5 mm as in FIG. 4A and the spacer is sandwiched, how the stress reduction effect changes depending on the spacer width and the thickness is analyzed through simulation, the summary of which is shown in FIG. 5A and FIG. 5B. In this test, the holder member has a diameter of 24φ and the penetration hole of the holder member has a diameter of 2.5φ. The swaging plate thickness as the plate thickness of the lower annular side wall of the holder member was 1.5 mm and the spacer had the same outer diameter as that of the cover member.

The analysis result showed that the existence of the spacer provided the stress reduction effect when compared with a case where only a swaging plate was provided. It was also found that the spacer having an increased width or thickness provided a further-improved stress reduction effect. However, the spacer width equal to the swaging margin does not provide such a reduction effect. It was also found that, even when the spacer having the same thickness as that of the lower cover is used, a stress reduction effect of about 10% can be obtained if a certain spacer width is secured.

Thus, the use of the spacer eliminates the need to needlessly increase the thickness of the swaging plate. Thus, a swaged part having a length so as to secure a certain swaging margin can secure a further higher pressure resistance performance to retain the pressure response member. This consequently solves the disadvantages found in the conventional swaging for providing an increased thickness that a manufacturing facility must have a larger size and a swaging processing causes a swaged part having winkles.

Returning to FIG. 3, the annular side wall 333 of the holder member 330 of the pressure switch 300 may have a length having a fixed swaging margin or more depending on the thickness of the spacer 336. Thus, the use of the spacer 336 can provide, even when the number of the diaphragms 122 is changed, the use of the same holder member 330 without requiring a change of the holder member 330 itself by including a certain margin in the length of the annular side wall 333.

As described above, this embodiment provides a pressure switch having a swaging structure having a high pressure resistance strength that solves the conventional disadvantages that the execution of the swaging for providing an increased thickness causes a manufacturing facility having a larger size or the swaged part having winkles or that a difficulty in the adjustment of the swaging margin is found when the number of diaphragms is changed for example.

Next, the second embodiment will be described.

Figure 6:
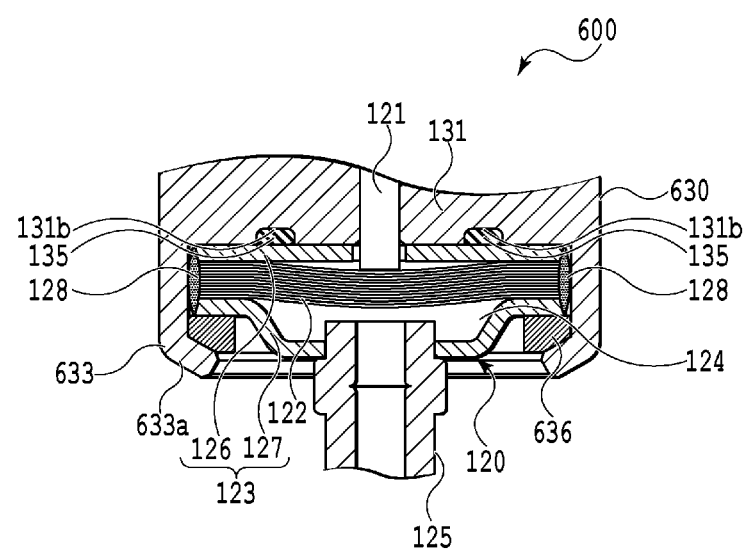
FIG. 6 is a partial cross sectional view illustrating the pressure switch of the second embodiment to which the swaging structure of the present invention is applied.

FIG. 6 is a partial cross sectional view illustrating the pressure switch 600 of the second embodiment to which the swaging structure of the present invention is applied. In FIG. 6, the pressure switch 600 is configured so that the lower cover 127 and the pressure response member swaging portion 633a sandwich an annular spacer 636 having a penetration hole at the inner side and having a tapered cross section in accordance with the swaging margin. The other configurations are the same as those of the pressure switch 300 of the first embodiment shown in FIG. 3.

As described above, according to this embodiment, the same effect as that of the first embodiment can be provided and the spacer 636 having a tapered cross section in accordance with the swaging margin allows the lower annular side wall 633 to be bend easily, thus providing an easy swaging processing.

Next, the third embodiment will be described.

Figure 7A:
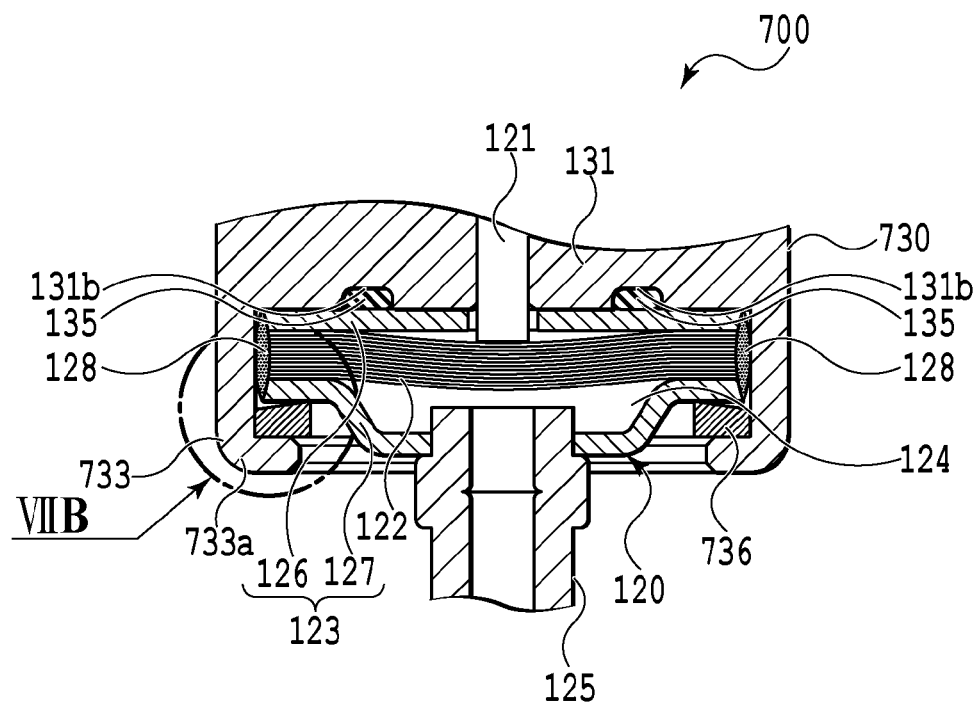
FIG. 7A is a partial cross sectional view illustrating the pressure switch of the third embodiment to which the swaging structure of the present invention is applied.
Figure 7B:
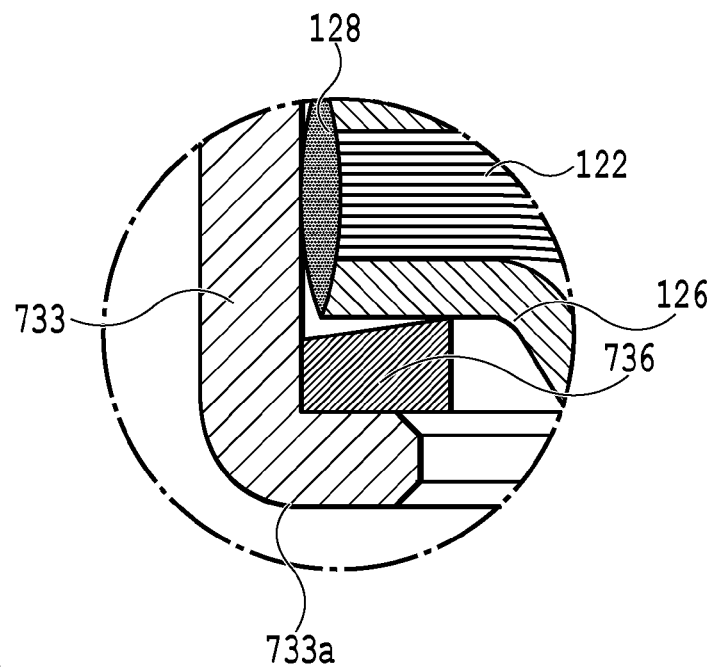
FIG. 7B is an expanded view illustrating the VIIB part of FIG. 7A.

FIG. 7A is a partial cross sectional view illustrating the pressure switch 700 of the third embodiment to which the swaging structure of the present invention is applied. FIG. 7B is an expanded view of the VIIB part shown in FIG. 7A. In FIG. 7A and FIG. 7B, the pressure switch 700 is configured so that the lower cover 127 and the pressure response member swaging portion 733a have therebetween an annular spacer 736 having a penetration hole at the inner side and having a tapered cross section provided at the lower cover 127—side face. The other configurations are the same as those of the pressure switch 300 of the first embodiment shown in FIG. 3.

As described above, according to this embodiment, the same effect as that of the first embodiment can be provided and the spacer 736 having a tapered cross section at the lower cover 127—side face stabilizes a pressed position and the swaging processing causes the deformation of the spacer 736 whose spring-back effect increases a retention force to retain the pressure response member 120.

Next, the fourth embodiment will be described.

Figure 8:
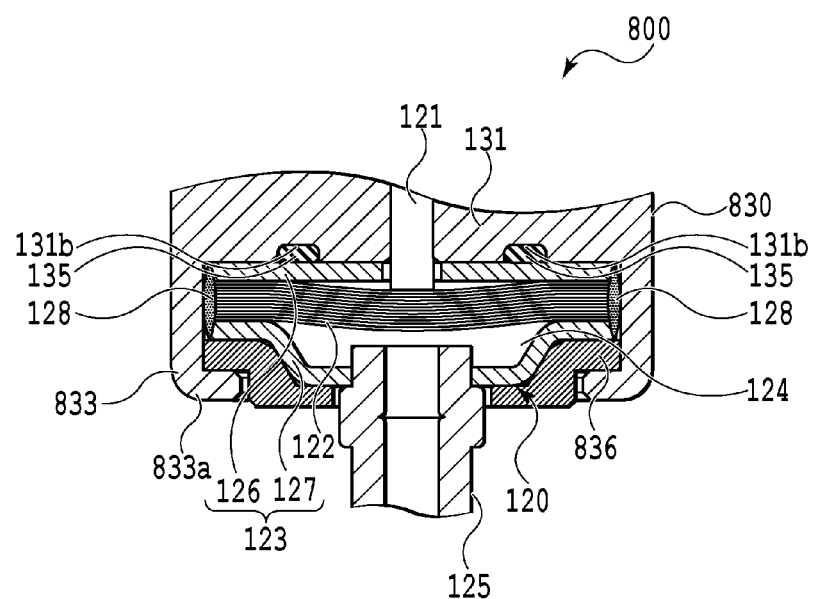
FIG. 8 is a partial cross sectional view illustrating the pressure switch of the fourth embodiment to which the swaging structure of the present invention is applied.

FIG. 8 is a partial cross sectional view illustrating the pressure switch 800 of the fourth embodiment to which the swaging structure of the present invention is applied. In FIG. 8, the pressure switch 800 is configured so that the lower cover 127 and the pressure response member swaging portion 833a have therebetween an annular spacer 836 having a penetration hole at the inner side and having a stepped portion in accordance with the shapes of the lower cover 127 and pressure response member swaging portion 833a. The other configurations are the same as those of the pressure switch 300 of the first embodiment shown in FIG. 3.

As described above, according to this embodiment, the same effect as that of the first embodiment can be obtained and the cross section of the spacer 836 has a stepped portion in accordance with the shapes of the lower cover 127 and the pressure response member swaging portion 833a. Thus, an increased area is provided at which the spacer 836 contacts the lower cover 127 and the pressure response member swaging portion 833a to thereby improve the pressure resistance performance.

Next, the fifth embodiment will be described.

Figure 9:
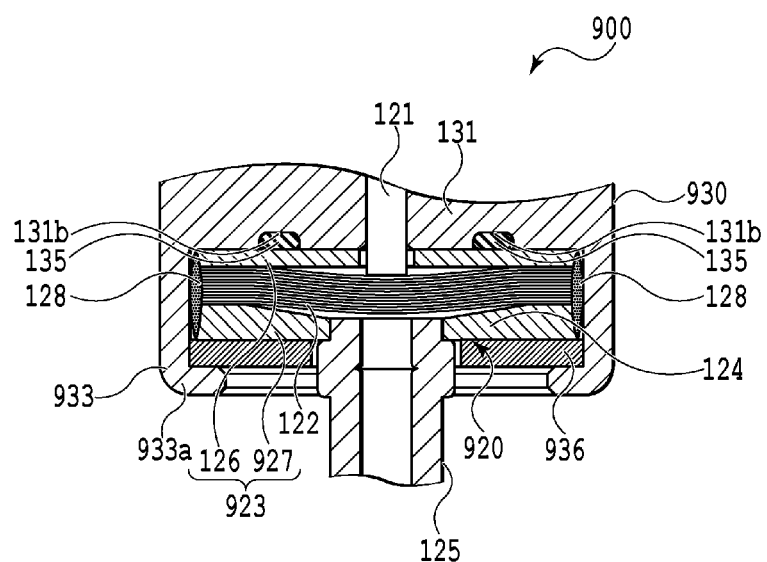
FIG. 9 is a partial cross sectional view illustrating the pressure switch of the fifth embodiment to which the swaging structure of the present invention is applied.

FIG. 9 is a partial cross sectional view illustrating the pressure switch 900 of the fifth embodiment to which the swaging structure of the present invention is applied. In FIG. 9, the pressure switch 900 is configured so that the lower cover 927 has a structure having a flat bottom face called a FLAT cap and the lower cover 927 and the pressure response member swaging portion 933a have therebetween an annular spacer 936 having a penetration hole at the inner side and having a rectangular cross section and a flat bottom face to cover the entire face of the lower cover 927. The other configurations are the same as those of the pressure switch 300 of the first embodiment shown in FIG. 3. In this embodiment, the lower cover 927 having a FLAT cap shape was combined with annular spacer 936 having a penetration hole at the inner side and having a rectangular cross section and a flat bottom face to cover the entire face of the lower cover 927. However, the invention is not limited to this and may use the spacers 636, 736, and 836 having the shapes described in the second to fourth embodiments described above.

As described above, according to this embodiment, the same effect as that of the first embodiment can be obtained and the spacer 936 covers the entire face of the lower cover 927 having a flat bottom face. This consequently increases an area at which the spacer 936 contacts the lower cover 927, thereby providing an improved pressure resistance performance.

As described above, a pressure switch is used as the swaging structure of the present invention in the first to fifth embodiments. However, the present invention is not limited to this. The invention may be applied to any structure having a to-be-swaged member and a swaging member configured to retain this to-be-swaged member by a swaging processing.

As described above, the swaging structure of the present invention can provide a swaging structure having a high pressure resistance strength suitable for a pressure switch for example that solves the conventional disadvantages that the execution of the swaging for providing an increased thickness causes a manufacturing facility having a larger size or the swaged part having winkles or that a pressure switch finds a difficulty in the adjustment of the swaging margin when the number of diaphragms is changed for example.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A swaging structure comprising:
   a pressure response member having a diaphragm as a pressure sensing means stored in a cover member and being formed to communicate with a pressure source,
   a micro switch having a switch for performing a switching operation based on the pressure sensing of the diaphragm, and
   a holder member for retaining the pressure response member and the micro switch,
   wherein:
   the holder member includes a partition wall and is formed to retain the micro switch at one side relative to the partition wall and to retain the pressure response member by a swaging processing at the other side relative to the partition wall, and
   the other side of the partition wall of the holder member for retaining the pressure response member includes an annular side wall surrounding the pressure response member, and
   an annular spacer that includes a penetration hole, wherein the annular spacer is sandwiched between the pressure response member and the annular side wall after the swaging processing such that the pressure response member is positioned between the annular spacer and the partition wall.

2. The swaging structure according to claim 1, wherein the micro switch is retained by the holder member by a swaging processing.

3. The swaging structure according to claim 1, wherein the spacer has a larger area contacting the pressure response member than an area contacting the annular side wall.

4. The swaging structure according to claim 3, wherein the micro switch is retained by the holder member by a swaging processing.

5. The swaging structure according to claim 1, wherein the spacer has a rectangular cross section.

6. The swaging structure according to claim 5, wherein the micro switch is retained by the holder member by a swaging processing.

7. The swaging structure according to claim 1, wherein the spacer has a tapered cross section that facilitates bending of the swaging part during the swaging process, the swaging part associated with a swaging margin.

8. The swaging structure according to claim 7, wherein the micro switch is retained by the holder member by a swaging processing.

9. The swaging structure according to claim 1, wherein the spacer has a tapered cross section at a position adjacent the swaging part.

10. The swaging structure according to claim 9, wherein the micro switch is retained by the holder member by a swaging processing.

11. The swaging structure according to claim 1, wherein the spacer has a cross section including a stepped portion in accordance with the pressure response member and a swaging margin.

12. The swaging structure according to claim 11, wherein the micro switch is retained by the holder member by a swaging processing.

13. The swaging structure according to claim 1, wherein the pressure response member has a FLAT cap structure having a flat bottom face, and the spacer has a rectangular cross section to cover the entire face of the flat bottom face of the pressure response member.

14. The swaging structure according to claim 13, wherein the micro switch is retained by the holder member by a swaging processing.

15. The swaging structure according to claim 13, wherein the spacer has a tapered cross section that facilitates bending of the swaging part during the swaging process, the swaging part associated with a swaging margin.

16. The swaging structure according to claim 15, wherein the micro switch is retained by the holder member by a swaging processing.

17. The swaging structure according to claim 13, wherein the spacer has a tapered cross section at a position adjacent the swaging part.

18. The swaging structure according to claim 17, wherein the micro switch is retained by the holder member by a swaging processing.

19. The swaging structure according to claim 13, wherein the spacer has a cross section including a stepped portion in accordance with the pressure response member and a swaging margin.

20. The swaging structure according to claim 19, wherein the micro switch is retained by the holder member by a swaging processing.

* * * * *